United States Patent

Weast

[11] Patent Number: 5,618,074
[45] Date of Patent: Apr. 8, 1997

[54] BRACKET SUPPORT

[76] Inventor: John B. Weast, 43 Summercress La., Coran, N.Y. 11727

[21] Appl. No.: 630,460

[22] Filed: Apr. 10, 1996

[51] Int. Cl.$^6$ .................................................. B60R 19/24
[52] U.S. Cl. .......................... 293/155; 403/11; 29/897.1; 29/897.2; 29/402.14; 29/402.15
[58] Field of Search ..................................... 293/154, 155, 293/102, 138; 403/11; 29/402.14, 402.15, 402.09, 897.1, 897.2

[56] References Cited

U.S. PATENT DOCUMENTS 1,364,878  1/1921  Halladay ............................ 293/155 X
1,513,046  10/1924  Kolb ...................................... 293/138
1,694,774  12/1928  Dykstra ................................ 293/155

*Primary Examiner*—Dennis H. Pedder
*Attorney, Agent, or Firm*—William F. Hamrock

[57] ABSTRACT

The invention is directed to large metal bumper mount assemblies secured to the front bumper of large tractor trailer trucks. A flower section of the bumper mount is easily broken off at its attachment to the bumper due to minor impacts with objects thereby exposing the assembly elements to further damage. There is provided a time saving and labor saving repair procedure whereby a strong metal triangular bracket is bolted to the bumper and to the bumper mount which covers the broken away exposed area and provides further protection to the underbody of the bumper mount.

15 Claims, 4 Drawing Sheets

BRACKET SUPPORT

BACKGROUND OF THE INVENTION

The invention relates to the repair of bumper mounts attached to the front bumper on motor vehicles and, more particularly, to the repair of bumper mounts on large trailer trucks which have been damaged at their attachments to the bumper.

Generally, there are two bumper mounts, also referred to as bracket front springs, attached to the interior of the front bumper of large trailer trucks such as Peterbilt trucks. The bumper mounts are usually made of cast aluminum are about eighteen inches in length, about fifteen inches at its highest point and about seven inches in width. They weigh about thirty to forty pounds.

There are two bumper mounts attached to a truck, one each at opposite ends of the front bumper. The two bumper mounts are attached at their front ends to the bumper and at their rear sections attached to and support the two frame rails which extend beneath the length of the vehicle. Also, attached to the bumper mounts are the front engine mount, the radiator mount and the front spring.

The bumper mounts are constructed to protect and prevent damage to the frame rails. This is accomplished by the bumper mounts absorbing the impact of a collision at the front end of the truck and protecting the frame rails from damage. Unfortunately, the lower front section of the bumper bracket can break off easily at its attachment to the bumper in only a minor collision with an object. Thus, the entire front bottom section of the bumper bracket is left dangling without support causing a serious structure problem. As a result the entire bumper bracket must be replaced at considerable cost for the parts and labor.

SUMMARY OF THE INVENTION

According to the present invention, there is provided a triangular bracket fabricated of a strong metal which will not break off upon impact with various sized objects. The triangular bracket has a front upstanding flange which is configured to cover over that bottom area over which the lower portion of the bumper bracket had covered before it had been broken off by the impact with the object. A pair of bolt holes in the front upstanding flange are aligned with the bolt holes in the bumper previously used to bolt the bottom of the broken away bumper bracket to the bumper. The triangular bracket is then bolted through these bolt holes to the bumper using the same bolts previously used. On the opposite side of the triangular bracket there is a longitudinal flange having a pair of flange legs which extend longitudinally beneath the bumper mount. The flange legs have a pair of bolt holes aligned with two bolt holes provided for two anchor bolts which bolt the spring pin to the bumper mount. The longitudinal flange legs are bolted to the underside of the bumper mount by these bolts which also continue to secure the spring pin in place as previously. The triangular bracket now protects the bumper mount from further damage upon impact with various objects and even protects the underbody of the bumper mount by the longitudinal flange legs which protection was not previously provided.

DETAILED DESCRIPTION OF THE PREFERRED EMBODIMENT

Figure 8:
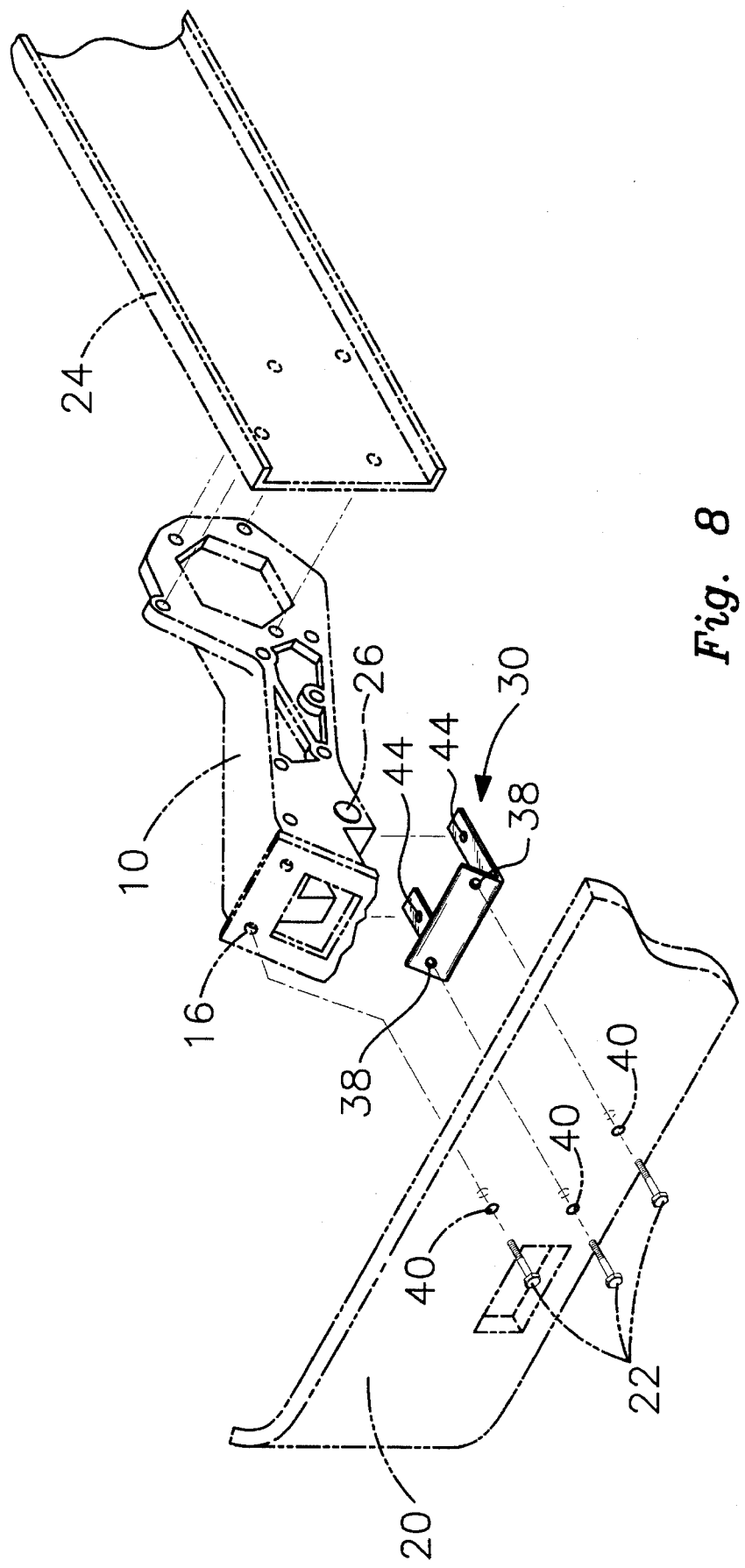
FIG. 8 is an exploded view illustrating a bumper section, triangular bracket, bumper bracket and frame rail.

Referring more specifically to the drawings, a bumper mount is designated generally by the reference numeral 10 and shown to include a front section 12 having a lower flange 14 with four top and bottom bolt holes 16 and a rear section 18. The front section 12 of the bumper mount is bolted to the interior of a vehicle by bumper bolts 22 to bumper 20 in a conventional manner as indicated in FIG. 8 through the top bolt holes and two bottom holes 16. The rear section 18 is bolted to a frame rail 24 in a conventional manner as indicated in FIG. 8. Also attached to the bumper mount 10 is a front spring 26, indicated in FIG. 6, and a front engine mount and radiator mount, not shown. Front spring 26 is bolted to the bumper mount 10 by anchor bolts 28 through bolts holes 29 in a conventional manner.

Figure 1:
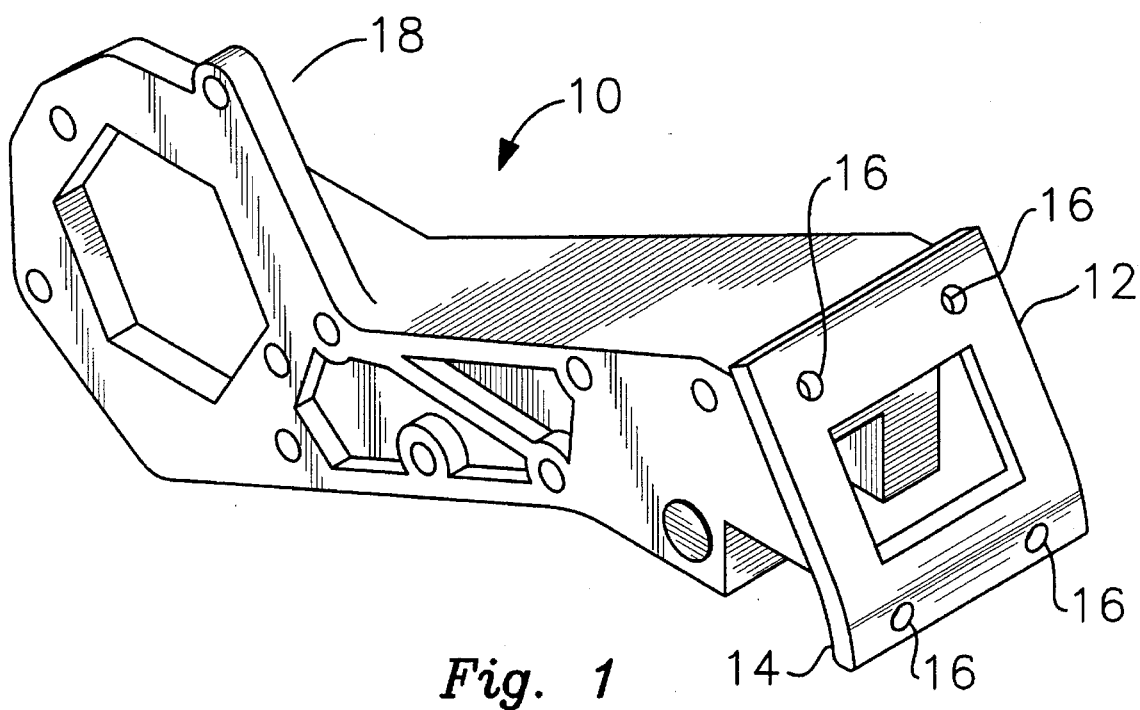
FIG. 1 is a perspective view illustrating a bumper bracket.
Figure 2:
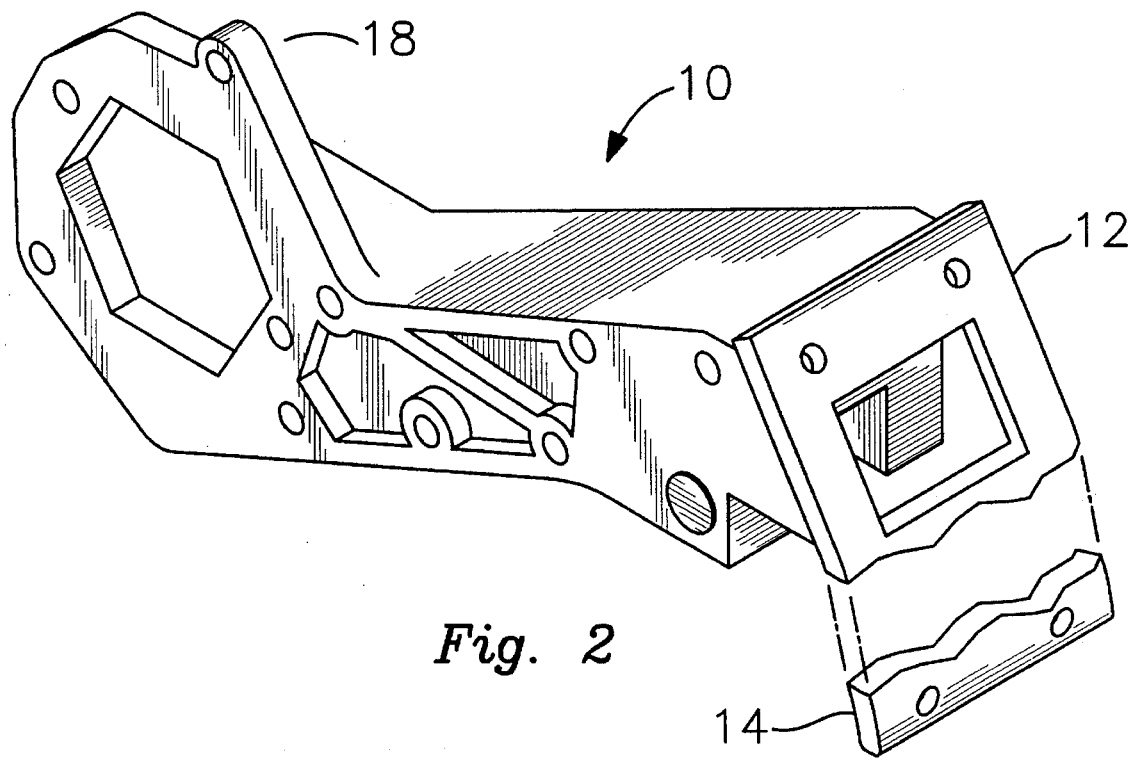
FIG. 2 is a perspective view illustrating the bumper bracket being broken off.

In the use of the bumper mount 10 of the type illustrated in FIG. 1, there is a tendency for its lower section 14 to break off upon impact with an object such as rocks or debris on the ground or being propelled against it. Generally, the impact may result from only a minor collision but being sufficient to break off the lower section 14 of the bumper mount as indicated in FIG. 2. Presently, the only means of repairing the damage is to completely dismantle the bumper mount 10 from the assembly as indicated in FIG. 8 which results in considerable cost for the replacement bumper mount and the labor involved. However, the new bumper mount is only operable until the next impact with an object as disclosed and then must be replaced again.

Figure 3:
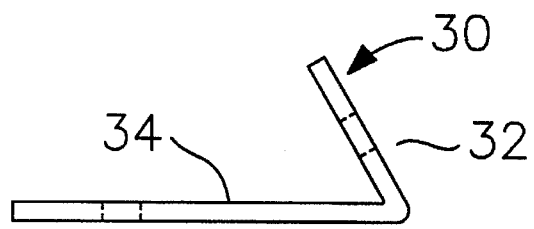
FIG. 3 is a side view of a triangular bracket of the invention.
Figure 4:
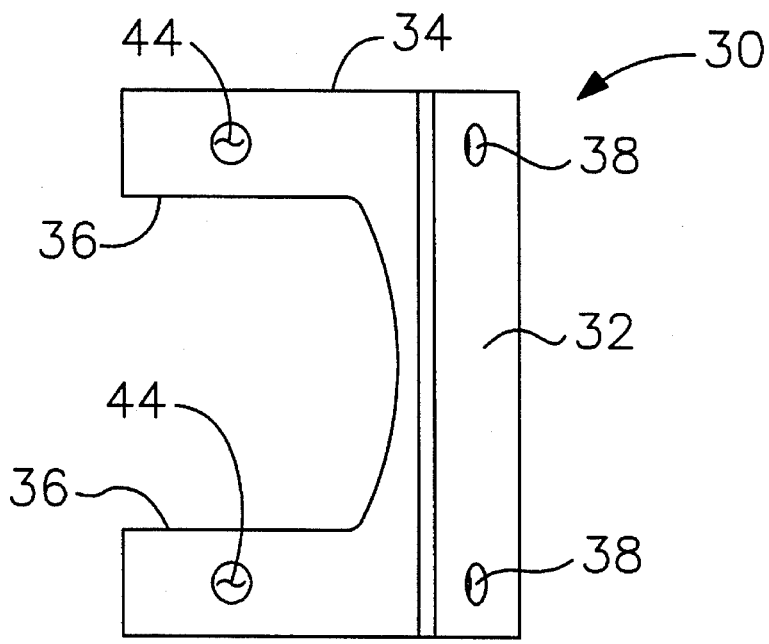
FIG. 4 is a top view of the triangular bracket.
Figure 5:
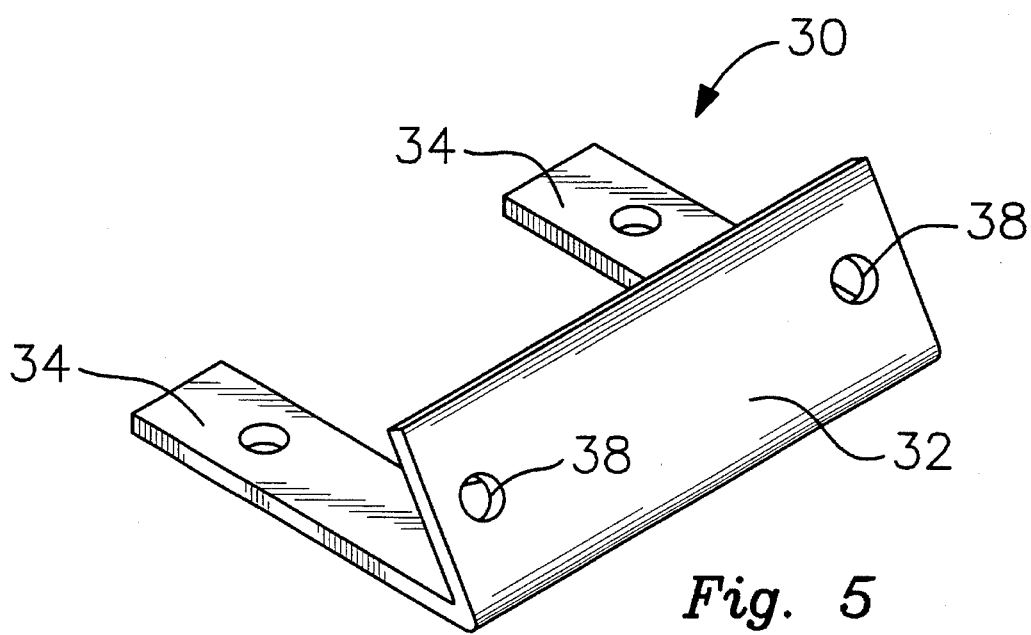
FIG. 5 is a perspective front angle view of the triangular bracket.

In order to overcome this problem, there is provided in accordance with the present invention a triangular bracket 30 as shown in FIGS. 3, 4 and 5. The triangular bracket 30 is made of sturdy metal which will not break off upon impact with various sized objects. Preferably, ten gage steel has proven to be satisfactory although other similar materials may be used.

Figure 6:
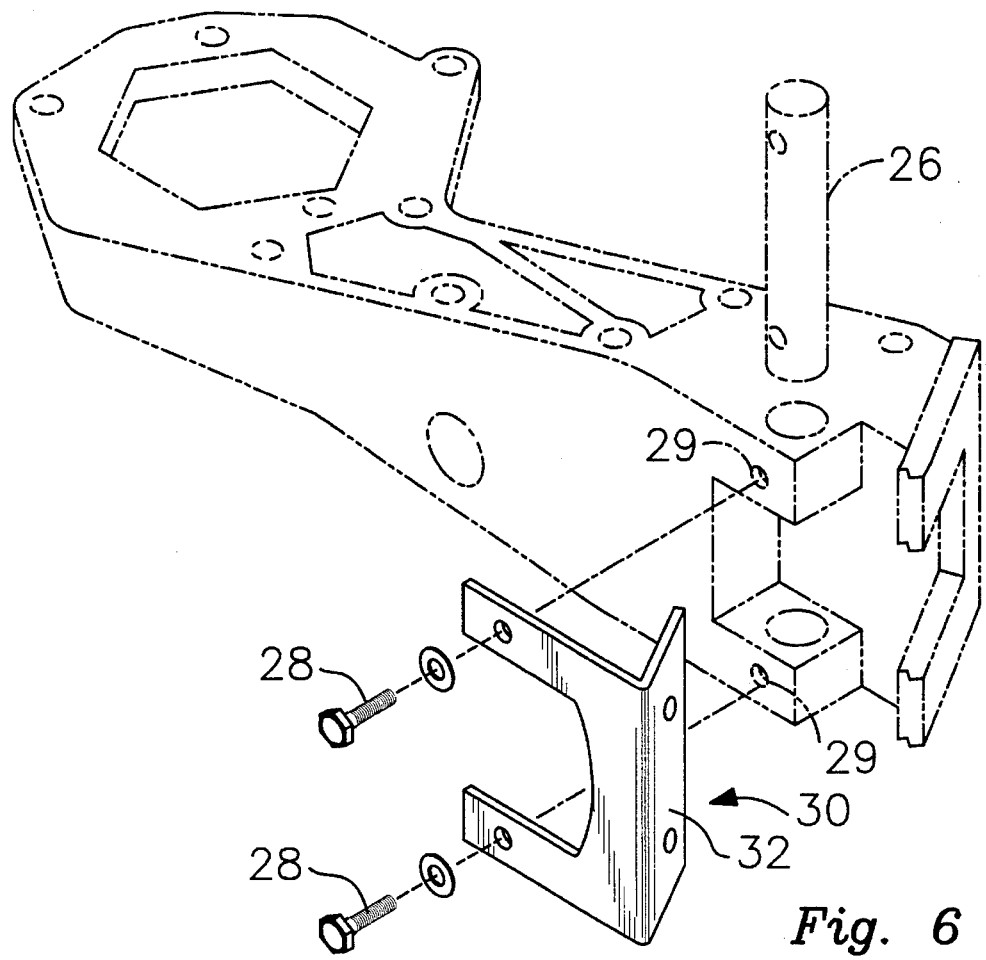
FIG. 6 is a perspective view illustrating the assembly of the triangular bracket to the bumper mount.
Figure 7:
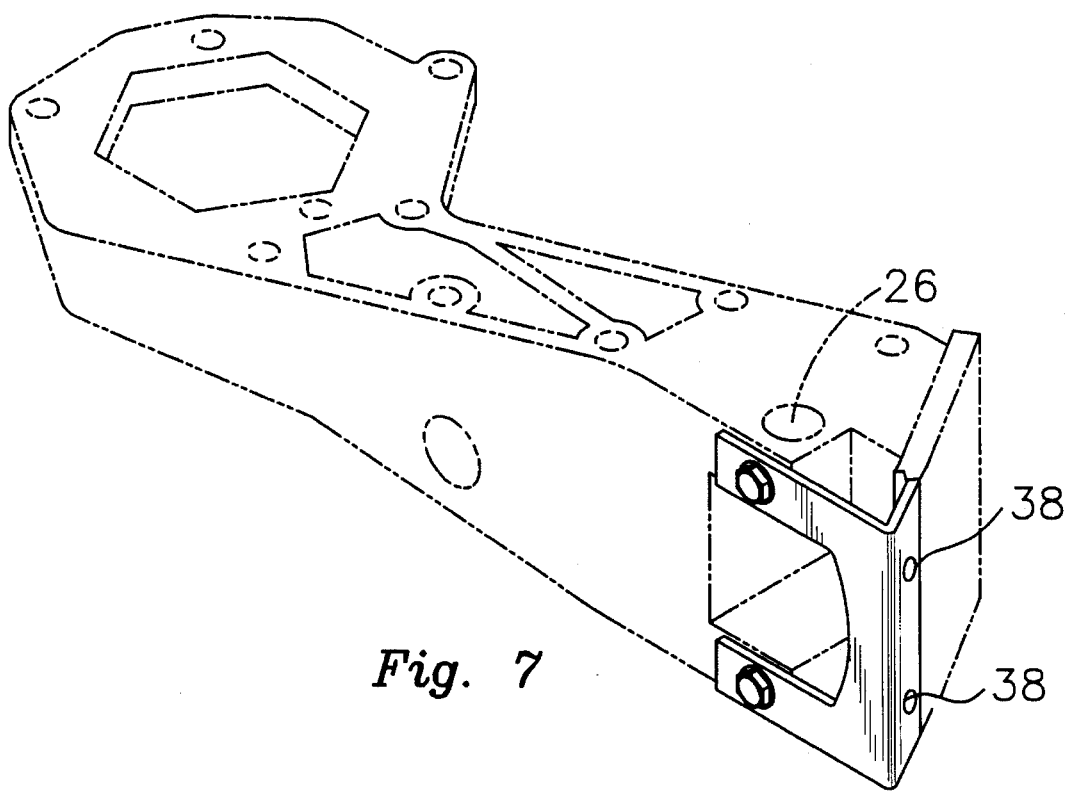
FIG. 7 is a perspective view illustrating the triangular bracket secured to the bumper mount.

The triangular bracket 30 includes a front upstanding flange 32 and a longitudinal flange 34 having a pair of flange legs 36 which extend longitudinally beneath the bumper mount 10 as seen in FIG. 7. The front upstanding flange 34 is configured to cover over the bottom area which the lower portion of the bumper bracket had covered before it had been broken off due to the impact and fracture. A pair of opposing bolt holes 38 are set in the front upstanding flange 32 so as to be aligned with the mounting bolt holes 40 in the bumper 20 as indicated in FIG. 8. This allows the triangular bracket 30 to be bolted to the interior of the bumper using the same bumper mounting bolts 22 previously used to bolt the broken off section 14 of the bumper mount to the bumper.

in accordance with the present invention as shown in FIGS. 6 and 7 of the drawings, the triangular bracket is secured to the bumper mount 10 using the front spring anchor bolts 28. The longitudinal flange 34 and flange legs 36 extend longitudinally beneath the bumper. A pair of opposing bolt holes 44 set in the flange legs 36 are aligned with the conventional front spring bolt holes 29 located at the base of the bumper mount. The triangular bracket 30 is bolted to the bumper mount using the two front spring anchor bolts 28 which still continue to bolt the spring pin 26 to the bumper mount. As seen int FIGS. 6 and 7, the triangular bracket 30 not only completely protects the broken away fragile area of the bumper mount but also can be bolted to the bumper 10 using the same bolts previously used to bolt the broken off section 14 to the bumper. In addition to this added frontal protection, the triangular bracket's longitudinal flange 34 and flange legs 36 of the invention also protect the front underbody of the bottom front area of the bumper mount 10 from danger. Thus not only does the present invention save time and expense in repairs but also produces an unexpectedly improved bumper mount.

Generally, the triangular bracket 30 of the invention is about seven inches in width, the front upstanding flange is about two inches in height, the longitudinal flange 34 extends about one and a half inches and the flange legs extend about six inches beneath the bottom front area of the bumper mount. The angle formed between the front upstanding flange and the longitudinal flange is about 60 degrees.

Thus it will be appreciated that as a result of the present invention, a highly effective repair system is provided for bumper mounts of the type described and by which the bumper mounts are completely repaired. It is to be understood, however, that while the invention has been disclosed in relation to large tractor trailer trucks such as Peterbilt trucks, the system is adaptable to other forms of vehicles having various types of motor mounts. Modifications and/or changes may be made in the disclosed embodiment without departure from the present invention. Accordingly, it is expressly understood that the foregoing description and accompanying drawings are representative of a preferred embodiment, not limiting, and that the true spirit and scope of the present invention is to be determined by reference to the appended claims.

What is claimed is:

1. A bumper mount attached to the underbody of a vehicle having a front bumper said bumper mount having a front flange partially broken off and a bottom front mounting means comprising a triangular bracket having an upstanding front flange side and a longitudinal lower flange side, said upstanding front flange side extending as a substantially linear extension of said front flange and mounted onto the bumper and said longitudinal lower flange side mounted onto the bumper mount bottom mounting means.

2. A bumper mount according to claim 1 wherein said upstanding front flange side includes bolt holes which are aligned with bolt holes in the bumper and is bolted thereto.

3. A bumper mount according to claim 2 wherein said longitudinal lower flange side includes bolt holes which are aligned with bolt holes in the bottom front of the bumper mount and is bolted thereto.

4. A bumper mount according to claim 3 wherein said upstanding front flange side is about two inches high.

5. A bumper mount according to claim 4 wherein said longitudinal lower flange side is about six inches long.

6. A bumper mount according to claim 5 wherein said longitudinal lower flange includes a pair of flange legs.

7. A bumper mount according to claim 6 wherein said lower flange side bolt holes are located in said flange legs.

8. A bumper mount according to claim 7 wherein the angle formed between said upstanding front flange side and said longitudinal lower flange side defines about a sixty degree angle to the front flange side.

9. A bumper mount according to claim 8 wherein said triangular bracket is made of metal.

10. A bumper mount according to claim 9 wherein said metal is ten gage steel.

11. A bumper mount according to claim 2 wherein said upstanding front flange side covers over said bottom area broken off of said bumper front flange.

12. A bumper mount according to claim 1 wherein said vehicle is a tractor trailer type truck.

13. A bumper mount according to claim 12 wherein said tractor trailer type truck is a Peterbilt truck.

14. A bumper mount according to claim 1 wherein frame rails are attached to said bumper mount.

15. A method of repairing a bumper mount for a vehicle having a front flange side section partially broken off at its attachment to a bumper and said bumper mount having a bottom front mounting means comprising providing a triangular bracket having an upstanding front flange side and a longitudinal lower flange side, mounting said upstanding front flange side within said partially broken off section, forming a substantially linear extension of the front flange side section, to the bumper and mounting said longitudinal lower flange to the bumper mount bottom front mounting means.

\* \* \* \* \*